United States Patent [19]
Ayerst

[11] Patent Number: 5,875,387
[45] Date of Patent: Feb. 23, 1999

[54] METHOD AND APPARATUS FOR RECEIVING A RADIO SIGNAL WITHIN A HOME CONTROL CHANNEL IN A MULTICHANNEL RADIO COMMUNICATION SYSTEM

[75] Inventor: Douglas I. Ayerst, Delray Beach, Fla.

[73] Assignee: Motorola, Inc., Schaumburg, Ill.

[21] Appl. No.: 418,735

[22] Filed: Apr. 7, 1995

[51] Int. Cl.⁶ .................................................. H04B 7/00
[52] U.S. Cl. .................. 455/31.3; 455/38.1; 455/515; 455/62; 455/450
[58] Field of Search ................. 455/31.3, 38.1, 455/62, 515, 450

[56] References Cited

U.S. PATENT DOCUMENTS

| | | | |
|---|---|---|---|
| 4,573,206 | 2/1986 | Grauel et al. | 455/56.1 |
| 4,713,808 | 12/1987 | Gaskill et al. | |
| 5,206,855 | 4/1993 | Schwendeman. | |
| 5,235,598 | 8/1993 | Sasuta | 370/110.1 |
| 5,239,678 | 8/1993 | Grube et al. | 455/34.1 |
| 5,353,332 | 10/1994 | Raith et al. | 379/60 |
| 5,404,355 | 4/1995 | Raith | 370/110.1 |

*Primary Examiner*—Andrew I. Faile
*Attorney, Agent, or Firm*—James A. Lamb

[57] ABSTRACT

In a system controller (102) a quantity of control channels is determined; a portion (344) of a code word (338) is set to identify the quantity of control channels; the code word (358) is transmitted in a predetermined portion (332) of each of a plurality of radio signals. In a multichannel radio (106) a receiver (610) is set to a first channel which includes one of the plurality of radio signals; the portion (344) of the code word (338) is decoded; one of the set of control channels is identified as a new home control channel, the home control channel is revised to the new home control channel, and the receiver (610) is set to the home control channel as revised. The one of the set of control channels is identified based on the quantity of control channels and a predetermined number in the multichannel radio (106).

25 Claims, 7 Drawing Sheets

METHOD AND APPARATUS FOR RECEIVING A RADIO SIGNAL WITHIN A HOME CONTROL CHANNEL IN A MULTICHANNEL RADIO COMMUNICATION SYSTEM

FIELD OF THE INVENTION

This invention relates in general to multichannel radio systems having a plurality of control channels for transmitting radio signals to multichannel radios, and in particular to a technique for determining a home control channel to which to set a receiver of a multichannel radio in a radio communication system in which the number of control channels can vary.

BACKGROUND OF THE INVENTION

In some multichannel radio systems having a plurality of outbound radio channels used by a plurality of multichannel radios, it has been found useful to define for each multichannel radio one of the plurality of outbound radio channels as a home control channel. Information and commands are sent to a multichannel radio, using the home control channel to notify the multichannel radio that information or commands are to be sent, and to indicate to the multichannel radio within which channel of the plurality of channels the information or command is to be sent. The set of home control channels forms a set of control channels, which may include all of the plurality of outbound channels used in the radio communication system, or may be a subset of the plurality of channels. The channels which are not control channels can be used for other purposes, such as temporarily assigning a multichannel radio to for receipt of a message which is long, or a message which has a bandwidth incompatible with the control channels. The number of control channels used in this type of system to achieve optimum efficiency typically varies depending on the statistics of the types of messages sent and the number of multichannel radios used. Therefore, it is desirable to be able to assign a home channel and change a home channel assignment of the multichannel radios in such a system.

A known technique of reassigning a home channel is to send an individual command to each multichannel radio, or each group of multichannel radios, commanding the multichannel radios to respond to a channel reassignment. For large systems, such as nationwide paging systems having zones which use a plurality of outbound control channels and have many thousands of multichannel pagers, individual and group addressing is very inefficient, however, because a command must be generated for each multichannel radio or group of multichannel radios requiring reassignment.

Thus, what is needed is a efficient means for efficiently changing a home control channel assignment for a multichannel radio in a radio communication system in which the number of control channels can vary.

SUMMARY OF THE INVENTION

Accordingly, in a first aspect of the present invention, a method used in a multichannel radio is for receiving a first radio signal within a home control channel. The multichannel radio is used in a radio communication system having a plurality of outbound radio channels. A set of control channels is a subset of the plurality of outbound radio channels. The method includes the steps of setting a receiver in the multichannel radio to a first channel which is one of the plurality of outbound radio channels, decoding a predetermined portion of a code word, identifying one of the set of control channels as a new home control channel, revising the home control channel to the new home control channel, and setting the receiver to the home control channel as revised, for receiving the first radio signal. In the step of decoding a portion of a code word, a portion of a code word included in a predetermined portion of a second radio signal received within the first channel is decoded. The portion of the code word identifies a quantity of control channels which form the set of control channels. In the step of identifying one of the set of control channels as a new home control channel, the one of the set of control channels is identified based on the quantity of control channels and a predetermined number in the multichannel radio.

Accordingly, in a second aspect of the present invention a method used in a system controller is for transmitting a radio signal to a multichannel radio within a home control channel in a radio communication system having a plurality of outbound radio channels. A set of control channels are a subset of the plurality of outbound radio channels. The method includes steps in which: a quantity of control channels is determined which form the set of control channels; a predetermined portion of a code word is set to identify the quantity of control channels; the code word is sent to a transmitter/receiver for transmission in a predetermined portion of each of a plurality of radio signals transmitted within the set of control channels during a first transmission cycle; one of the set of control channels is identified as a new home control channel for the multichannel radio based on the quantity of control channels and a predetermined number stored in the multichannel radio; the new home control channel is stored as the home control channel associated with the multichannel radio; and message information is sent to a transmitter/receiver for inclusion in the first radio signal, which is transmitted within the home control channel during a transmission cycle subsequent to the first transmission cycle.

Accordingly, in a third aspect of the present invention, a multichannel radio is for receiving a first radio signal within a home control channel. The multichannel radio is used in a radio communication system having a plurality of outbound radio channels. A set of control channels is a subset of the plurality of outbound radio channels. The multichannel radio includes a receiver, a decoder, a channel selector element, a control channel quantity element, and a home channel identifier element.

The receiver receives and demodulates radio signals. The decoder, which is coupled to the receiver, decodes code words from the radio signals. The channel selector element, which is coupled to the receiver, sets the receiver in the multichannel radio to a first channel which is one of the plurality of outbound radio channels. The control channel quantity element, which is coupled to the decoder, decodes a predetermined portion of a code word included in a predetermined portion of a second radio signal received within the first channel which identifies a quantity of control channels which form the set of control channels. The home channel identifier element identifies one of the set of control channels as a new home control channel based on the quantity of control channels and a predetermined number in the multichannel radio and revises the home control channel to the new home control channel. The channel selector element is further coupled to the home channel identifier element and sets the receiver to the home control channel as revised by the home channel identifier element, for receiving the first radio signal.

Accordingly, in a fourth aspect of the present invention, a system controller transmits a radio signal to a multichannel radio. The multichannel radio is used within a home control channel in a radio communication system having a plurality of outbound radio channels. A set of control channels are a subset of the plurality of outbound radio channels. The system controller includes an outbound message memory, a channel organizer element, a control channel indicator element, a cell site controller, a subscriber data base, a home channel identifier element. The outbound message memory stores a queue of outbound messages intended for a plurality of multichannel radios. The channel organizer element, which is coupled to the outbound message memory, determines a quantity of control channels which form the set of control channels. The control channel indicator element, which is coupled to the channel organizer element, sets a predetermined portion of a code word to identify the quantity of control channels. The cell site controller, which is coupled to the control channel indicator element, sends the code word to a transmitter/receiver for transmission in a predetermined portion of each of a plurality of radio signals transmitted within the set of control channels during a first transmission cycle. The subscriber data base stores a first predetermined number which is based on a second predetermined number stored in the multichannel radio. The home channel identifier element, which is coupled to the channel organizer element and the subscriber data base, identifies one of the set of control channels as a new home control channel for the multichannel radio based on the quantity of control channels and the second predetermined number stored in the multichannel radio. The subscriber data base is coupled to the home channel identifier element and stores the new home control channel as the home control channel associated with the multichannel radio. The cell site controller is further coupled to the outbound message memory and the subscriber data base and sends message information to a transmitter/receiver for inclusion in the radio signal, which is transmitted within the home control channel stored in the subscriber data base during a transmission cycle subsequent to the first transmission cycle.

DETAILED DESCRIPTION OF THE DRAWINGS

Figure 1:
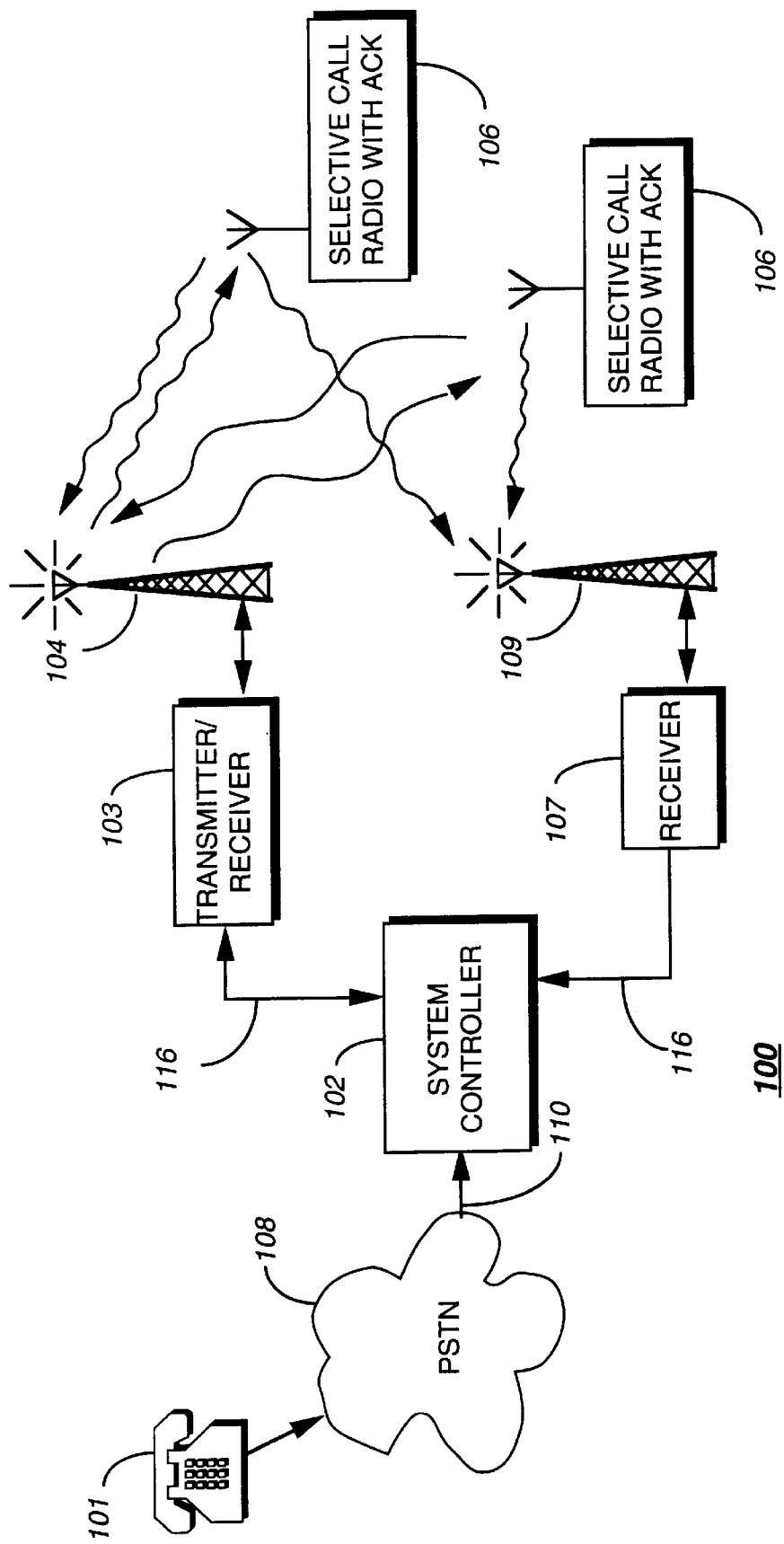
FIG. 1 is an electrical block diagram of a radio communication system, in accordance with the preferred and alternative embodiments of the present invention.

Referring to FIG. 1, an electrical block diagram of a radio communication system 100 is shown in accordance with the preferred embodiment of the present invention. The radio communication system 100 comprises a message input device, such as a conventional telephone 101 connected through a conventional switched telephone network (PSTN) 108 by conventional telephone links 110 to a system controller 102. The system controller 102 oversees the operation of at least one radio frequency transmitter/receiver 103 and at least one fixed system receiver 107, through one or more communication links 116, which typically are twisted pair telephone wires, and additionally can include RF, microwave, or other high quality audio communication links. The system controller 102 encodes and decodes inbound and outbound telephone addresses into formats that are compatible with land line message switch computers. The system controller 102 also functions to digitally encode and schedule outbound messages, which can include such information as digitized audio messages, alphanumeric messages, and response commands, for transmission by the radio frequency transmitter/receivers 103 to a plurality of multichannel selective call radios 106. The system controller 102 further functions to decode inbound messages, including unsolicited and response messages, received by the radio frequency transmitter/receivers 103 and the fixed system receivers 107 from the plurality of selective call radios 106.

Examples of response messages are acknowledgments and designated response messages. Designated response messages are communicated in the inbound channel in portions named data units. An acknowledgment is a response to an outbound message initiated at the system controller 102. An example of an outbound alphanumeric message intended for a selective call radio 106 is a page message entered from the telephone 101. The acknowledgment indicates successful reception of the outbound message. A designated response message is a message sent from a selective call radio in response to a command included in an outbound message from the system controller 102. An example of a designated response message is a message initiated by the selective call radio 106, but which is not transmitted until after a response command is received from the system controller 102. The response command, in turn, is sent by the system controller 102 after an inbound message requesting permission to transmit the designated response message is communicated from the selective call radio 106 to the system controller 102. The response messages are preferably transmitted at a time designated within the outbound message or response command, but alternatively can be transmitted using a non-scheduled protocol, such as the ALOHA or slotted ALOHA protocol, which are well known to one of ordinary skill in the art.

An unsolicited message is an inbound message transmitted by a selective call radio 106 without having received an outbound message which requires a response. An example of an unsolicited message is an inbound message from a selective call radio 106 which alerts the radio communication system 100 that the selective call radio 106 is within radio range of the radio communication system 100. An unsolicited message can include a request to transmit a designated response and can include data such as alphanumeric, fax, or digitized voice data. Unsolicited messages are transmitted using an ALOHA or slotted ALOHA protocol. The outbound messages are included in outbound radio signals transmitted from a conventional antenna 104 coupled to the radio frequency transmitter/receiver 103. The inbound messages are included in inbound radio signals received by the conventional antenna 104 coupled to the radio frequency transmitter/receiver 103 and the conventional antenna 109 coupled to the fixed system receiver 107.

It should be noted that the system controller 102 is capable of operating in a distributed transmission control environment that allows mixing conventional cellular, simulcast, master/slave, or other coverage schemes involving a plurality of radio frequency transmitter/receivers 103, conventional antennas 104, 109, and fixed system receivers 107, for providing reliable radio signals within a geographic area as large as a nationwide network. Moreover, as one of ordinary skill in the art would recognize, the telephonic and selective call radio communication system functions may reside in separate system controllers 102 which operate either independently or in a networked fashion.

It should also be noted that the radio frequency transmitter/receiver 103 may comprise the fixed system receiver 107 collocated with a conventional radio frequency transmitter.

It will be appreciated that other selective call radio devices (not shown in FIG. 1), such as one and two way pagers, conventional mobile cellular telephones, mobile radio data terminals,. mobile cellular telephones having attached data terminals, or mobile radios (trunked and non-trunked) having data terminals attached, and having single or multichannel receiving capability are also able to be used in the radio communication system 100. In the following description, the term "selective call radio" will be used to refer to the personal radio telephone, the portable transmitting/receiving device 106, a mobile cellular telephone, a mobile radio data terminal, a mobile cellular telephone having an attached data terminal, or a mobile radio (conventional or trunked) having a data terminal attached and having multichannel capability. Each of the selective call radios assigned for use in the radio communication system 100 has an address assigned thereto which is a unique selective call address. The address enables the transmission of a message from the system controller 102 only to the addressed selective call radio, and identifies messages and responses received at the system controller 102 from the selective call radio. Furthermore, each of one or more of the selective call radios also has a unique telephone number assigned thereto, the telephone number being unique within the PSTN 108. A list of the assigned selective call addresses and correlated telephone numbers for the selective call radios is stored in the system controller 102 in the form of a subscriber data base.

Figure 2:
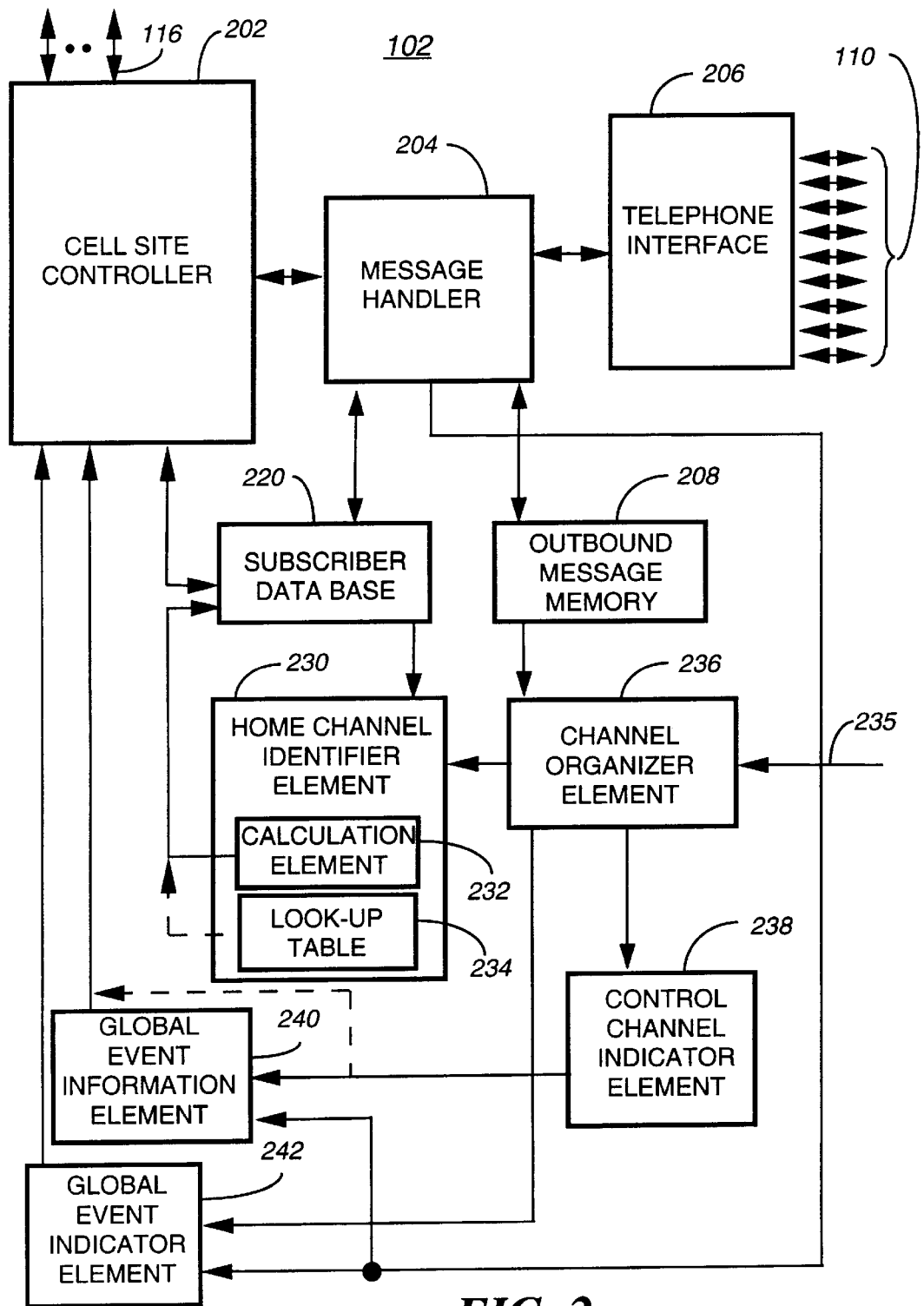
FIG. 2 is an electrical block diagram of a system controller used in the radio communication system, in accordance with the preferred and alternative embodiments of the present invention.

Referring to FIG. 2, an electrical block diagram of the system controller 102 is shown, in accordance with the preferred and alternative embodiments of the present invention. The system controller 102 comprises a cell site controller 202, a message handler 204, an outbound message memory 208, a subscriber data base 220, a telephone interface 206, a home channel identifier element 230, a channel organizer element 236, a control channel indicator element 238, a global event information element 240, and a global event indicator element 242. The cell site controller 202 is coupled to the radio frequency transmitter/receivers 103 (FIG. 1) and fixed system receivers 107 (FIG. 1) by the links 116. The cell site controller 202 couples outbound messages including selective call addresses to the transmitter/receivers 103 and controls the transmitter/receivers 103 to transmit transmission cycles which include the outbound messages. The cell site controller 202 also processes inbound messages from the selective call radios 106. The inbound messages are received by the transmitter/receivers 103 and fixed system receivers 107, and are coupled to the cell site controller 202. The message handler 204, which routes and processes messages, is coupled to the telephone interface 206, the subscriber data base 220, and the outbound message memory 208. The telephone interface 206 handles the switched telephone network 108 (PSTN) (FIG. 1) physical connection, connecting and disconnecting telephone calls at the telephone links 110, and routing the audio signals between the telephone links 110 and the message handler 204.

The subscriber data base 220 stores information for each subscriber, including a correlation between a selective call address assigned to each selective call radio 106 and the telephone number used within the PSTN 108 to route messages and telephone calls to each selective call radio 106, as well as other subscriber determined preferences, such as hours during which messages are to be held back from delivery to the selective call radio 106. The outbound message memory 208 is for storing a queue of messages which are queued for delivery to at least one of the plurality of selective call radios 106, wherein each message of the queue of messages is associated with a selective call address, also stored in the outbound message memory 208, of one of the plurality of selective call radios 106 for which each message is intended. The message handler 204 schedules outbound messages and the selective call addresses associated therewith within a transmission cycle. The message handler 204 also determines response schedules for response messages which minimize contention of messages at transmitter/receivers 103 and fixed system receivers 107, and includes response timing information in outbound messages so that selective call radios 106 will respond according to the response schedule. The message handler 204 identifies an inbound message as being a response message associated with one of the selective call radios in the subscriber data base 220, identifies the response message as being associated with one of the outbound messages in the outbound message memory 208. The message handler 204 then further processes the outbound and response messages according to their content. The cell site controller 202, the message handler 204, the outbound message memory 208, the subscriber data base 220, and the telephone interface 206, are conventional elements of the system controller 102.

As one example of an operation of the system controller 102, the delivery of an outbound message stored in the outbound message memory 208 is completed when the outbound message has been communicated to the intended selective call radio 106, the message is presented on a display of the selective call radio 106 by a user action, a message response is communicated back to the system controller 102 from the selective call radio 106, and the message response is identified by the message handler 204 as being a user acknowledgment generated by the selective call radio 106 specifically for the outbound message. In this example, the message handler 204 generates another message which is sent to the originator of the outbound message to notify the originator that the message has been acknowledged by the selective call radio 106.

Unique functions of the system controller 102 in accordance with the preferred embodiment of the present invention are included in the home channel identifier element 230, the channel organizer element 236, the control channel indicator element 238, the global event information element 240, and the global event indicator element 242.

In accordance with the preferred and alternative embodiments of the present invention, the radio communication system 100 uses a plurality of outbound radio channels for communication of outbound messages. The transmission cycles in the plurality of radio channels are preferably synchronized such that protocol divisions of the transmission cycles on each of the plurality of outbound radio channels occur simultaneously, down to the shortest division, which is a data symbol. The selective call radios 106 are multichannel radios, each capable of receiving on any one of the outbound radio channels. The system controller 102 organizes system and message information for transmission within the plurality of outbound radio channels, using a outbound signaling protocol based on the well known FLEX™ protocol by Motorola. As described more fully below, the outbound signaling protocol includes control frames and data frames. Selective call address information can be communicated in control frames but not in data frames. Radio channels which are used exclusively for control frames, or for control frames and data frames, are called control channels. Each selective call radio 106 is normally assigned to one of the control channels, which is called a home control channel, by the system controller 102. The radio channels used as control channels form a set of control channels which include at least one outbound radio channel, and may include up to all of the outbound radio channels, whereas the remaining channels, which include only data frames, are data channels. The number of radio channels used for control channels is altered depending on message traffic statistics within the system. For example, if a large percentage of the messages are short messages and the total amount of message information requires most of the capacity available on all outbound radio channels, then most or all of the outbound radio channels are used as control channels. It will be appreciated that one benefit of having fewer control channels is that the cell site controller 202 can pack long message information more efficiently into data channels.

Each selective call radio 106 in the radio communication system 100 is equipped with a battery saver element which normally prevents the selective call radio 106 from receiving radio signals except during a predetermined period of the transmission cycle. For example, in the protocol described below, there are 128 frames in each transmission cycle. Each selective call radio 106 in the system is typically assigned to receive during only one of the frames, or periods, in such a manner that the message traffic generated for all the active selective call radios 106 in the system is substantially evenly distributed. One method used for such distribution is to use the eight least significant bits of the selective call address to define the frame number of the frame which is the predetermined period, but other methods could be used. For example, a number could be programmed into the selective call radio 106 which explicitly determines a predetermined frame number.

The channel organizer element 236 is coupled to the outbound message memory 208, for determining a quantity of control channels which form the set of control channels. An example is when the radio system has been operating with a number of control channels (for example, two), and message traffic statistics change which require an additional control channel for optimum handling. As will be seen from more detailed descriptions below, the control channels handle short messages more optimally than the non-control channels, so that a shift in message length statistics can be a reason for an increase or decrease in the number of control channels. The channel organizer element 236 also is coupled to an input 235 from an operator console allowing a manual input which changes the number of control channels, for example, in response to new channel equipment having been added throughout the radio communication system 100. The channel organizer element 236 is coupled to the home channel identifier element 230, the control channel indicator element 238, and the global event indicator element 242.

When a change in the number of control channels occurs, the event is coupled to the global event indicator element 242, while the new number of control channels is coupled to the home channel identifier element 230 and to the control channel indicator element 238. The change in the number of control channels is defined as a global event because it results in information which must be communicated to all active selective call radios 106. The control channel indicator element 238 encodes the number of channels into a portion of a code word, which is coupled to and stored in the global event information element 240. The encoded new number of channels constitutes the global event information associated with the global event. The global event indicator element 242 couples a signal to the cell site controller 202 which includes in each frame of the next complete transmission cycle within each outbound radio channel a global event indicator, which is decoded by each active selective call radio 106 when each selective call radio 106 decodes the predetermined frame which it is assigned in accordance with the battery saving function described above. The decoding of the global event indicator is described more fully below. Each selective call radio 106 is thereby alerted to decode frame zero of the transmission cycle subsequent to the one in which the global event indicator is sent repetitively, for decoding the global event information, which in this case is the new number of control channels. The global event information element 240 couples the global event information to the cell site controller 202 for inclusion in frames number zero of the transmission cycles which are within each of the set of control channels and which are subsequent to the one in which the global event indicator is sent. When each selective call radio 106 decodes the new number of control channels in frame zero, each selective call radio 106 then determines a new home control channel and sets its receiver to the new home channel to be able to receive any new information intended for the selective call radio 106. Because of the very important nature and brevity of the home control channel information, it is also included in frame zero of all transmission cycles within all control channels, for use by any selective call radio 106 which, for example, is coming onto the radio communication system 100 for a first time, or which receives the control channel information in error and must reacquire a home control channel. Other global event information, such as a lengthy all call text message, would not typically be repeated in additional cycles.

The home channel identifier element 230 uses the new number of control channels determined by the channel organizer element 236 and a predetermined control channel logical number which is stored in the subscriber data base 220 in association with the address of the selective call radio 106, and which is also stored in the selective call radio 106, to determine a new home control channel for the selective call radio 106. The new home control channel is coupled to and stored in the subscriber data base 220, along with the transmission cycle at which the new home control channel is effective. The new home control channel replaces the current home control channel stored in the subscriber data base 220 in association with the selective call radio 106 when subsequent messages are sent to the selective call radio 106, after the number of new channels has been sent as global event information in the identified frame zero of a transmission cycle (i.e., when the selective call radio 106 has switched to the new home control channel).

In accordance with the preferred embodiment of the present invention, the home channel identifier element 230 comprises a calculation element 232 which determines the new home control channel, H, as a mathematical function of the new number of control channels, N, and the predetermined control channel logical number, L. The new home control channel, N, is coupled to the subscriber data base 220. The mathematical function is expressed as the integral value of the remainder of a division of L by N. For example, when N is 3 and L is 5, then H is 2. This approach provides nearly uniform distribution of home control channel assignments over the plurality of selective call radios 106 when the control channel logical numbers are substantially uniformly distributed among the selective call radios 106. The uniformity is typically improved when the control channel logical numbers are substantially uniformly assigned over a range which is the least common multiple (LCM) of the possible sizes of the set of control channels. For example, when the maximum number of control channels is 4, 5, or 6, the range is best set, respectively, to 12 (the LCM of 1, 2, 3, and 4), 60 (the LCM of 1, 2, 3, 4, and 5) and 60 (the LCM of 1, 2, 3, 4, 5, and 6).

In accordance with a first alternate embodiment of the present invention, the home channel identifier element 230 comprises a lookup table element 234 having the new number of control channels, N and the predetermined control channel logical number, L, as inputs, and the new home control channel, H, as the output. The new home control channel, H, is coupled to the subscriber data base 220. An example is shown below in Table 1, wherein the L values are row inputs, the N values are column inputs, and the H values are determined from the cell contents at the intersection of the rows and columns.

TABLE 1

| L | N | | | |
|---|---|---|---|---|
|   | 1 | 2 | 3 | 4 |
| 1 | 1 | 2 | 2 | 2 |
| 2 | 1 | 1 | 3 | 3 |
| 3 | 1 | 2 | 1 | 4 |
| 4 | 1 | 1 | 2 | 1 |
| 5 | 1 | 2 | 3 | 2 |
| 6 | 1 | 1 | 1 | 3 |
| 7 | 1 | 2 | 2 | 4 |
| 8 | 1 | 1 | 3 | 1 |

Thus, when an outbound message which has been scheduled for transmission within a transmission cycle is coupled to the cell site controller 202 by the message handler 204, the message handler also couples the home control channel assignment for the selective call radio 106 which is intended to receive the message, by looking up the home control channel assignment in the subscriber data base 220, using the selective call address which is associated with and stored with the message in the outbound message memory 208.

System controller 102 is preferably a model MPS2000® paging terminal manufactured by Motorola, Inc., of Schaumburg Ill., modified with unique firmware elements in accordance with the preferred embodiment of the present invention, as described herein. The cell site controller 202, the message handler 204, the outbound message memory 208, the subscriber data base 220, the telephone interface 206, the home channel identifier element 230, the channel organizer element 236, the control channel indicator element 238, the global event information element 240, and the global event indicator element 242 are preferably implemented within portions of the model MPS2000® paging terminal which include, but are not limited to those portions providing program memory, a central processing unit, input/output peripherals, and a random access memory. The system controller alternatively could be implemented using a model E09PED0552 PageBridge® paging terminal manufactured by Motorola, Incorporated of Schaumburg, Ill. The subscriber data base 220 and the outbound message memory 208 can alternatively be implemented as magnetic or optical disk memory, which can alternatively be external to the system controller 102.

It will be appreciated that other types of global events exist. An example, which is indicated in FIG. 2 by the coupling of the message handler 204 to the global event indicator element 242 and the global event information element 240, is an all call message. When a message (such as a text message or a voice message) is determined by the message handler 204 to be intended for communication to all selective call radios 106 active in the radio communication system 100, it is an all call message. The all call message is a global event, which is coupled to the global event indicator element 242. The message information (such as alphanumeric text, analog signals, compressed analog voice, or digitized voice) is coupled to the global event information element 240, and is communicated to all active selective call radios 106 in the same manner as the home control channel information described above, although the all call message is more typically only communicated in one frame zero, not in each.

It will be appreciated that the global event information can alternatively be included in an alternatively predetermined frame 360 other than frame zero.

It will also be appreciated that in the first example of global events described above, in which a change of quantity of home channels is communicated to the multichannel radios, the channel organizer element 236 and the control channel indicator element act in combination as a global event element which determines the occurrence of the global event, and provides the global event information. In the second example of global events described above, in which an all call message is communicated to the multichannel radios, the message handler 204 acts as the global event element which determines the occurrence of the global event, and provides the global event information.

In accordance with a second alternative embodiment of the present invention, the global event indicator element 242 and the global event information element 240 are not included in the system controller 102, and the global event information is coupled directly to the cell site controller 202 for inclusion in every frame until all numbered frames have been transmitted once. As in the preferred embodiment of the present invention, the global event information must also be included in all subsequent frame zeroes if it is vital for system operation. It will be appreciated that global information is repeated many times in accordance with the second alternate embodiment of the present invention, which reduces overall outbound information throughput in the radio communication system 100 in comparison to the preferred embodiment of the present invention.

Figure 3:
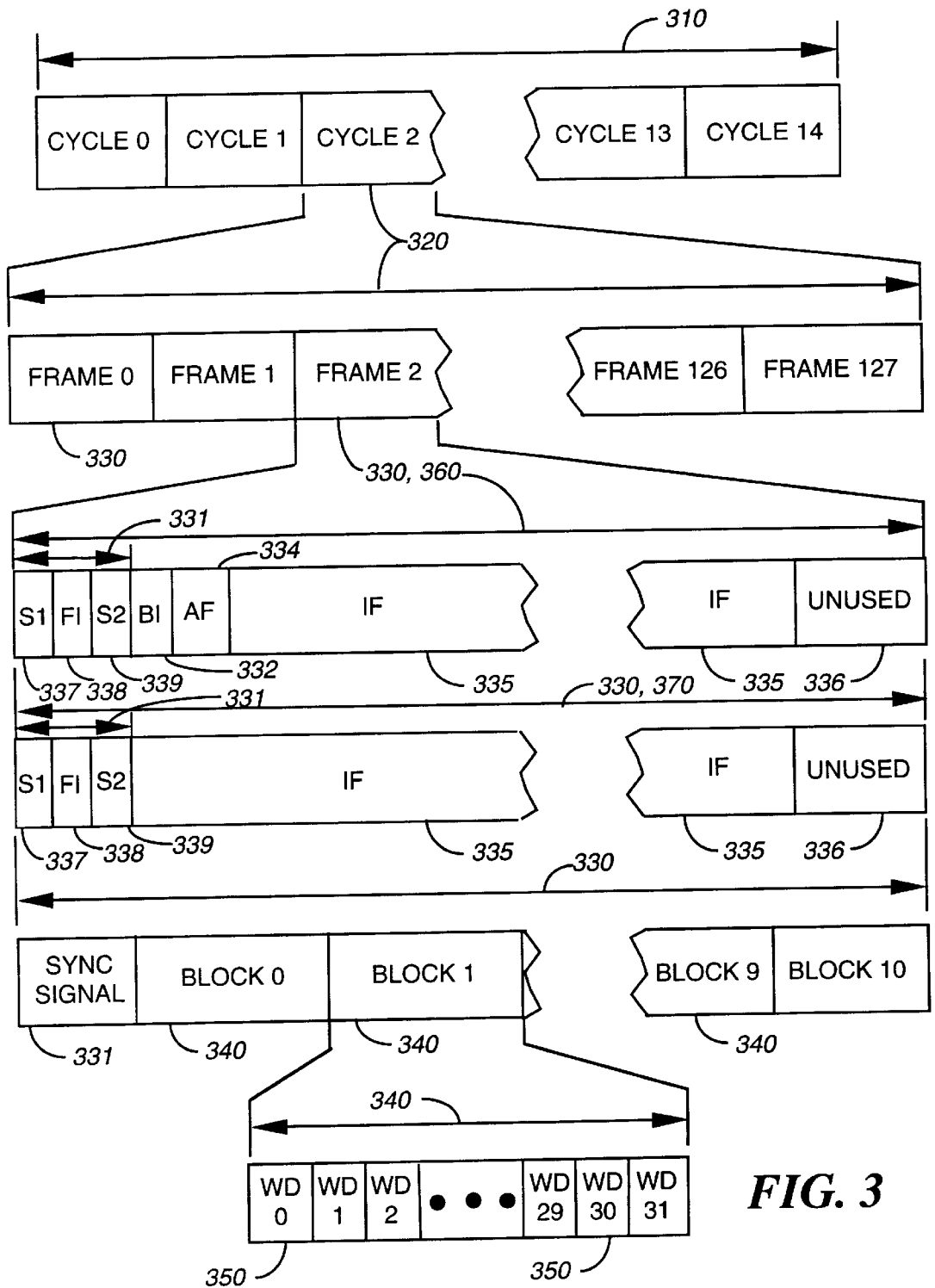
FIGS. 3, 4, and 5 are timing diagrams of frames included in a radio signal transmitted by a transmitter in radio communication system, in accordance with the preferred and alternative embodiments of the present invention.

Referring to FIG. 3, a timing diagram illustrating features of the transmission format of an outbound signaling protocol utilized by the radio communication system of FIG. 1 to transmit a message from the system controller 102 to the selective call radio 106 is shown, in accordance with the preferred and alternative embodiments of the present invention. The signaling protocol is similar to the FLEX™ protocol, which is a synchronous outbound signaling protocol in that both protocols have protocol divisions of cycle, frame, block, word, symbol, and bit which are equivalent in duration. The signaling protocol is subdivided into protocol divisions, which are an hour 310, a cycle 320, a frame 330, a block 340, and a word 350. Up to fifteen 4 minute uniquely identified cycles are transmitted in each hour 310. Normally, all fifteen cycles 320 are transmitted each hour. Up to one hundred twenty eight 1.875 second uniquely identified frames are transmitted in each of the cycles 320. Normally, all one hundred twenty eight frames are transmitted. One synchronization signal 331 lasting one hundred fifteen milliseconds and 11 one hundred sixty millisecond uniquely identified blocks 340 are transmitted in each of the frames 330. The synchronization signal includes a first sync portion 337, a frame information word 338, and a second sync portion 339. The frame information word 338 includes 21 information bits and 11 parity bits. The information bits identify a cycle number, a frame number, and include a bit which is set to one to indicate a global event. A bit rate of 1600 bits per second (bps), 3200 bps, or 6400 bps is usable during the blocks of each frame 330. The bit rate of the blocks of each frame 330 is communicated to the selective call radios 106 during the synchronization signal 331. When the bit rate is 1600 bps, 8 thirty two bit uniquely identified words 350 are transmitted in each block 340. For bit rates of 3200 bps or 6400 bps, 16 uniquely identified words or 32 uniquely identified words, respectively, each having 32 uniquely identified bits, are included in each block 340. In each word, at least 11 bits are used for error detection and correction, and 21 bits or less are used for information, in a manner well known to one of ordinary skill in the art. In some words, 15 bits are used for error detection and correction, and 17 bits are for information, in a manner well known to one of ordinary skill in the art. The bits and words 350 in each block 340 are transmitted in an interleaved fashion using techniques well known to one of ordinary skill in the art to improve the burst error correction capability of the protocol. The transmission cycle referred to above in the description of the system controller 102 with reference to FIG. 2 comprises a cycle 320.

A frame 330 is further defined to be one of two specific types depending upon the information found within the frame 330. The first type of frame 330 is a control frame 360. The second type of frame 330 is a data frame 370.

Information is included in each control frame 360 in fields, comprising system information in the frame information word 338 and a block information field (BI) 332, one or more selective call addresses with subvectors in an address field (AF) 333, one or more of a set of vector packets, short message packets, and long messages in the information field (IF) 335, and an unused field 336 having no useful information therein. Each selective call address with subvector is preferably two words in length. The subvector portion of the selective call address is preferably eight bits in length. Each vector packet and short message packet in the information field 335 of a control frame 360 corresponds to at least one of the addresses in the address field 333 of the same control frame 360. Each long message in the information field 335 corresponds to at least one vector packet in the information field 335 of at least one or more control frames 360. The boundaries of the fields 332, 333, 335, 336 are defined by the words 350, not by the blocks 340, and the length of the fields 332, 333, 335, 336 are variable, depending on factors such as the type and amount of system information included in the block information field 332, the type of addresses used, and the amount of information in each message. In particular, the boundary between the address field 333 and the information field 335 is referred to as the address field boundary 334. Thus, the length of each of the fields 332, 333, 335, 336 can be shorter or longer than a block 340. The unused field 336 can be zero length when the total of the lengths of the other fields 332, 333, 335 equals eleven blocks 340. All vector packets and short messages intended for a particular selective call radio 106 are preferably scheduled for transmission in a predetermined one or more of the frames 330 of each cycle 320, so as to allow the particular selective call radio 106 to go into a low power (non-receive) mode during other frames when short messages and vectors are not included for the particular selective call radio 106. The block information field 332 in this example includes two bits to indicate the number of active forward channels and two bits to indicate the number of forward channels which are control channels. The frequencies of the active and control channels are predetermined for each possible combination. It will be appreciated that additional or fewer bits could be used equally well for systems having more or fewer possible active and control channels.

Information is included in each data frame 370 in fields, comprising system information in the frame information word 338, long messages in the information field (IF) 335, and an unused field 336 having no useful information therein. A block information field (BI) 332 is not included in data frames 370 in accordance with the preferred embodiment of the present invention, but is optionally included in other embodiments. Each long message in the information field 335 corresponds to at least one vector packet in the information field 335 of at least one or more control frames 360. The boundaries of the fields 332, 335, 336 are defined by the words 350, not by the blocks 340, and the length of the fields 332, 335, 336 are variable, depending on factors such as the type and amount of system information included in the block information field 332 (when included), and the amount of information in the long messages.

The vectors contain information which specifies the starting word of a long message, in terms of the protocol divisions described above, and additionally, radio channel information such as radio channel frequency, subchannel offset from the radio channel frequency, side band, and in-phase or quadrature channel. The starting position and length of a long message, a short message, or a vector packet define the protocol position of the long message, short message, or vector packet. The protocol position can be on a different radio channel and in a different division (i.e., cycle, frame, block) of the protocol.

When a selective call radio 106 detects its address with subvector within a control frame 360, the selective call radio 106 is typically directed by the subvector to receive one of a vector packet or a short message packet within the control frame 360 wherein the address with subvector is detected. (In a limited number of cases, the address can include all the information needed to be conveyed to the selective call radio 106 in the form of a predetermined pattern of the subvector bits which are not used for position indication within the control frame 360, but rather for a limited number of messages having low information content. An example is an acknowledgment to an inbound message from the selective call radio 106)

When a selective call radio 106 decodes a vector packet in a control frame 360 which is associated with its selective call address, the selective call radio 106 is directed to receive and decode a long message in either the same control frame 360, or another control frame 360, or a data frame 370. The frame 330 in which the selective call radio is to receive the long message is in a radio signal transmitted in either a first radio channel where the selective call radio 106 detects its address with subvector, or a second channel different than the channel where the selective call radio detects its address with subvector.

Figure 4:
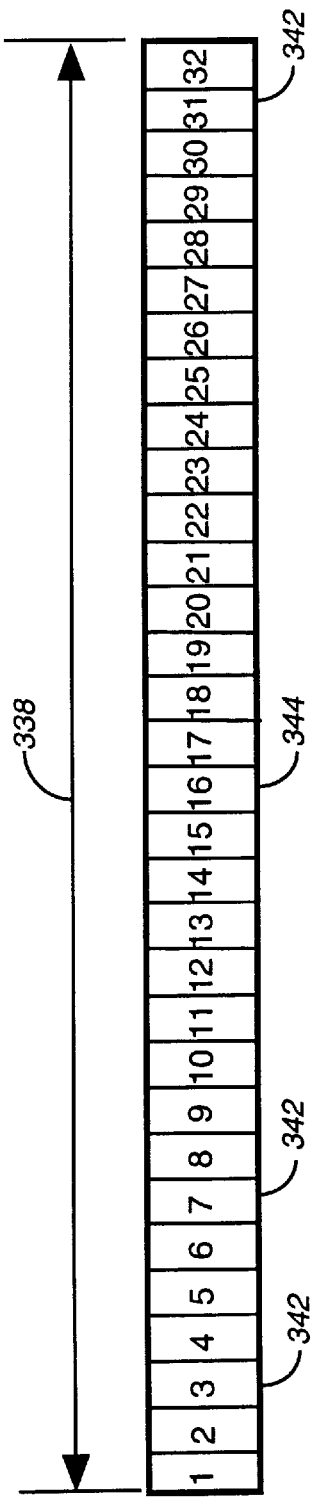

Referring to FIG. 4, a timing diagram illustrating the bit structure of the frame information word 338 used in the frames 360, 370 (FIG. 3) is shown, in accordance with the preferred and alternative embodiments of the present invention. The bits 342 in the frame information word are identified as bit one through bit thirty two. The global event indicator is a global bit sixteen 344 of the frame information word in the preferred embodiment of the present invention, although it will be appreciated that another bit 342 could be used equally well.

Figure 5:
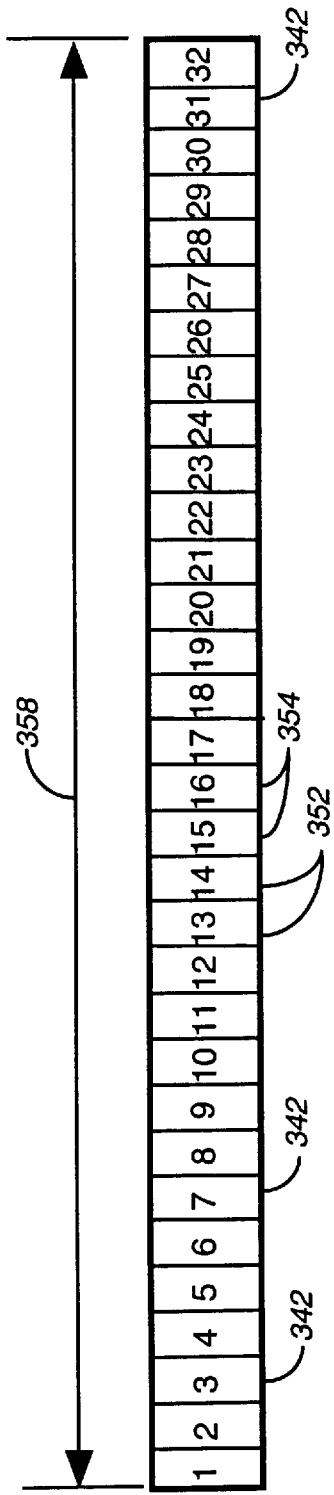

Referring to FIG. 5, a timing diagram illustrating the bit structure of block information word one 358 is shown, in accordance with the preferred and alternative embodiments of the present invention. Block information word one 358 is used to indicate the number of active forward channels and the number of forward channels which are control channels. The bits 342 in the block information word are identified as bit one through bit thirty two. The number of active forward channels is preferably indicated by bits thirteen and fourteen 352, and the number of forward channels which are control channels is preferably indicated by bits fifteen and sixteen 354 in the preferred embodiment of the present invention, although it will be appreciated that other bits 342 could be used equally well.

It will be appreciated that the global event indicator bit 344 could be alternatively included in the block information word, but that inclusion in the frame information word 338 has a benefit, in that a selective call radio 106 which is turned on in a cold start mode during the 4 minute cycle 320 in which a global event indicator is being sent, and prior to having an assigned, predetermined frame, or is turned on after the predetermined frame assigned to the selective call radio 106 (when the predetermined frame is stored from a prior time through the cold start), has passed, the selective call radio 106 will be delayed by an extra 4 minutes in receiving the global event information, or perhaps entirely miss the global event information (when it is sent only once). Also, in situations wherein a selective call radio 106 activates itself during each synchronization portion of a plurality of frames 360, 370 during a cycle 320, for example to maintain a highly accurate automatic frequency control of a receiver carrier frequency, the selective call radio 106 can overcome a situation in which the global event indicator is received in error during the predetermined frame 360 assigned for receiving messages.

Figure 6:
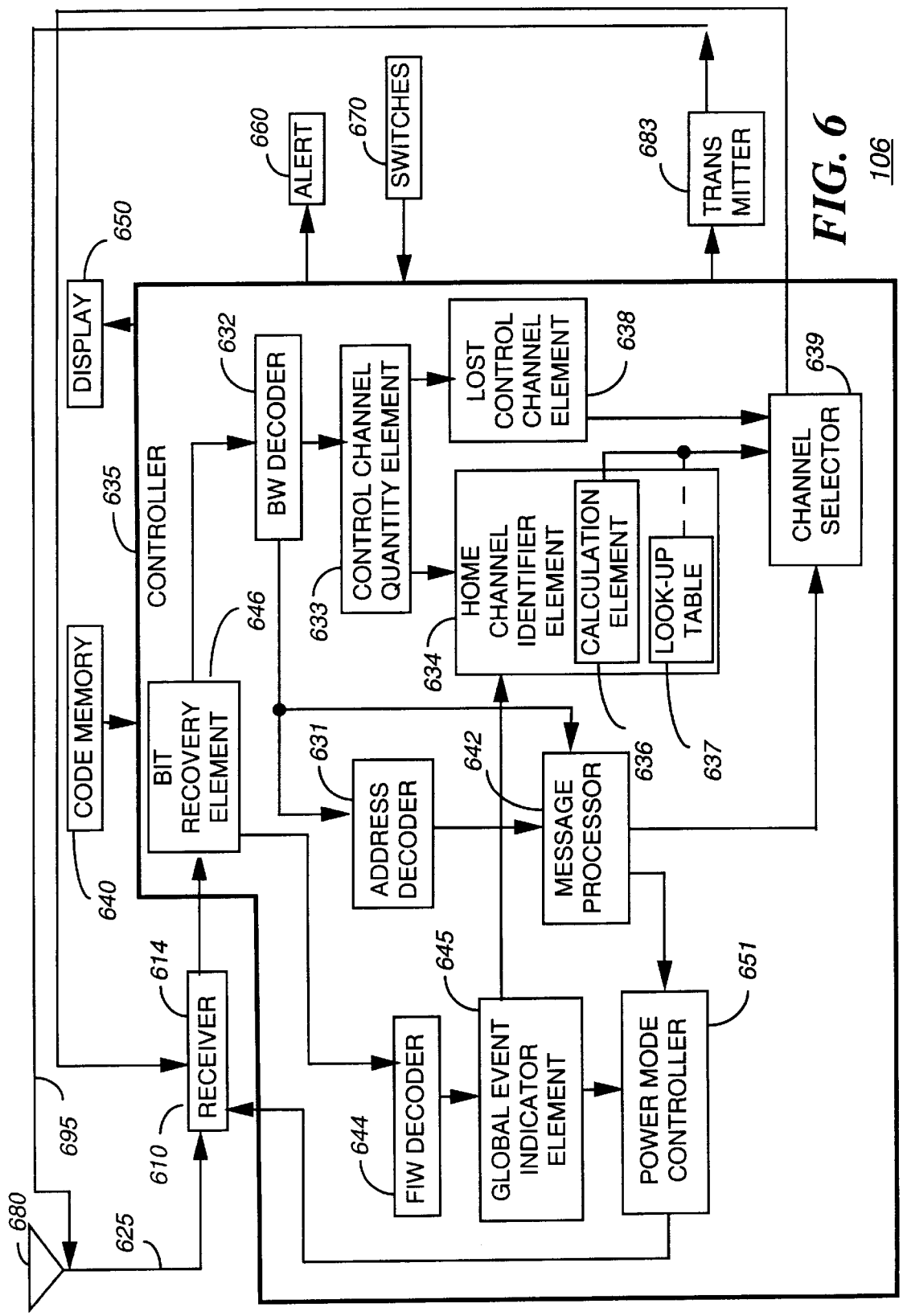
FIG. 6 is an electrical block diagram of a selective call radio used in the radio communication system, in accordance with the preferred and alternative embodiments of the present invention.

Referring to FIG. 6, an electrical block diagram of a multichannel selective call radio 106 with inbound messaging capability is shown, in accordance with the preferred and alternative embodiments of the present invention. The selective call radio 106 includes an antenna 680 for intercepting and transmitting radio signals. A first intercepted signal 625 in this example includes a control frame 360 which is transmitted within the home control channel at the protocol position (for example, frame two) predetermined for use by the selective call radio 106 when the selective call radio 106 is operating in its normal battery saving mode. Also in this example, a long message is included in a data frame 370 transmitted within a second outbound channel, which is not necessarily a control channel. The long message is intended for reception by the selective call radio 106. The data frame 370 which includes the long message is a data frame which occurs after the predetermined control frame 360 (frame two). The long message is a text message intended for presentation on display 650. Accordingly, the control frame 360 (frame two) includes the selective call address of the selective call radio 106, which includes a sub-vector indicating a position within the control frame 360 (frame two) of a vector which identifies the second outbound channel and the frame within the data frame 370 where the long message is located. The antenna 680 is coupled to a conventional receiver 610 and a conventional transmitter 683. The receiver 610 and the transmitter 683 are coupled to a controller 635. The controller 635 is coupled to a code memory 640, a display 650, an alert 660, and a set of switches 670. The controller 635 comprises a bit recovery element 646, a frame information word decoder 644, a global event indicator element 645, a power mode controller 651, a block word decoder 632, an address decoder 631, a message processor 642, a channel selector 639, a control channel quantity element 633, a home channel identifier element 634, and a lost control channel element 638. Just prior to receipt of the synchronization signal 331 of the control frame 360 which is at the predetermined protocol position (frame two) within the cycle 320, the power mode controller 651 sets a power mode of the selective call radio 106 to a normal power state, in which the receiver 610 begins receiving radio signals. The intercepted signal 625 is coupled to the receiver 610 wherein the intercepted signal 625 is received, which includes filtering to remove undesirable energy at off channel frequencies, amplification of the filtered signal, frequency conversion of the signal 625, and demodulation of the signal 625 in a conventional manner. The receiver 610 thereby generates a demodulated signal 614 which is coupled to the bit recovery element 646 of the controller 635.

The bit recovery element 646 recovers bits from the data symbols received at a predetermined outbound data rate in the demodulated signal 614, generating a binary signal. The binary signal includes the information transmitted in the frames 360 of this example in the form of data symbols, with errors possibly induced during the radio communication of the signal. The binary signal is coupled to the frame information word decoder 644 and the block word decoder 632. The frame information word decoder 644 performs error detection and correction decoding of the frame information words 338, in a manner well known to one of ordinary skill in the art. The block word decoder 632 performs error detection and correction decoding of the words 350 from the blocks 340, in a manner well known to one of ordinary skill in the art. When the frame information word 338 is sufficiently error free, it is coupled to the global event indicator element 645, which determines whether the global event indicator is set or not set. In accordance with the preferred embodiment of the present invention, the global event indicator is bit 16 of the frame information word 338. When the global event indicator is set, the global event indicator element 645 generates a global event signal which is coupled to the power mode controller 651 and the control channel quantity element 633.

The block word decoder 632 is coupled to the control channel quantity element 633, the address decoder 631, and the message processor 642. The control channel quantity element 633 determines a quantity of active outbound radio channels which are control channels from predetermined bits in the block information field 332, and couples the quantity to the home channel identifier element 634 and the lost control channel element 638. When a block information field 332 is included in a frame 360, 370 and decoded by the block word decoder 632, the quantity of control channels determined by the control channel quantity element 633 is used by the home channel identifier element 634 to determine a home channel. The home channel will typically be the same as the home channel determined from a previous frame, unless an undetected error occurs, no block information field is included, or a new home channel is determined due to a change in the number of control channels. Accordingly, when no global event signal has been coupled from the global event indicator element within the last cycle 320, the home channel identifier element 634 will couple a new home channel to the channel selector only when the home channel identifier element 634 has determined a new home channel consistently for a predetermined consecutive number of decoded block information fields, which is preferably two. When the selective call radio 106 receives no block information fields for a predetermined duration, the lost control channel element 638 couples a predetermined default control channel to the channel selector. In accordance with the preferred embodiment of the present invention, the predetermined default control channel is a predetermined control channel defined for use in the radio communication system when there is only one control channel. Thus, when a selective call radio 106 is turned on after having been off for some time and, for example, comes up on a channel which is not a control channel and has no block information field 332, the selective call radio 106 will switch to a control channel, determine the appropriate home control channel, and switch to it.

The home channel identifier element 634 preferably uses the calculation element 636 to determine the home channel from the quantity of control channels and a predetermined number stored in the selective call radio 106. The technique of determination and the definition of the predetermined number for the calculation element 636 is identical to that described with respect to the calculation element 232 of the system controller 102. In accordance with a third alternate embodiment of the present invention, the look-up table 637 can be used, in which the technique of determination and the definition of the predetermined number is identical to that described with respect to the look-up table element 234 of the system controller 102.

The controller 635 is coupled to a code memory 640, in which is stored one or more addresses assigned to the selective call radio 106, such as a local address (used in a "home" portion of the radio communication system 100), a "roaming" address (used in other portions of the radio communication system 100), and a group address (shared with other "home" selective call radios 106). The assigned address(es) are also referred to herein as the embedded addresses. When the controller 635 determines that the address field 333 of the control frame 360 (frame two), which includes the selective call address, is sufficiently error free the controller 635 couples the address field 333 to the address decoder 631 which compares each outbound selective call address in the control frame 360 (frame two) to the embedded addresses. When none of the outbound selective call addresses in the recovered control frame 360 (frame two) match any embedded selective call address before the address boundary 334 (FIG. 3), the controller 635 puts the selective call radio 106 into a low power mode in which the selective call radio 106 cannot receive radio signals, and the controller 635 ceases further processing of the demodulated signal 614 until the beginning of the next cycle 320 (inasmuch as the global event bit was set in this example) or, alternatively, until a later time when a subsequent control frame 360 (frame two) is transmitted at the predetermined position which potentially includes a selective call address for the selective call radio 106 (in the case when the global event bit is not set).

When any outbound selective call address in the recovered control frame 360 (frame two) and an embedded selective call address match, a valid address signal is coupled to the message processor 642, which responds by recovering the subvector portion of the address and determining the starting position of the vector as a number of words from the address boundary 334. The starting position is coupled from the message processor 642 to the power mode controller 651, which in response switches the selective call radio 106 to the low power mode until the starting position of the vector, at which time the power mode controller 651 switches the selective call radio 106 to the normal power mode. The words in the control frame 360 (frame two) which include the vector information are received by the receiver 610, decoded by the block word decoder 632, and coupled to the message processor 642. The duration of the vector is determined by the message processor 642 from information within the data packet and coupled to power mode controller 651, which switches the power mode to the low power mode at the end of the data packet. During the low power mode, processing of message information continues, but signal reception does not. The message processor 642 decodes the starting position of the long message from the vector, which includes in this example an indication that the long message is in a later frame position of the same cycle 320, in a data frame which is transmitted within the second outbound radio channel.

The message processor 642 generates a channel indicator for the long message which is coupled to the channel selector 639, and couples the decoded starting position of the long message to the power mode controller 651. The power mode controller 651 switches the power mode of the selective call radio 106 to the normal power mode and the channel selector 639 switches the receiving frequency of the receiver 610 to the frequency of the second outbound radio channel at the beginning of the long message. A second intercepted signal 625 is received by the receiver 610, decoded by the block word decoder 632, and the message processor 642 recovers the long message during the protocol position determined from the starting position determined from the vector and the length of the long message. The length of the long message is determined by the message processor 642 from information in the long message in the demodulated signal 614 and coupled to the power mode controller 651 and channel selector 639. At the end of the long message, the power mode controller 651 switches the power mode of the selective call radio 106 to the low power mode, and the channel selector 639 switches the receiving frequency of the receiver 610 to the frequency of the home control channel.

The controller 635 is coupled to a set of switches 670, to which the controller 635 is responsive for setting and controlling a plurality of operational modes of the selective call radio 106. Depending on the operational mode of the selective call radio 106, and depending on the contents of the long message, the controller 635 couples information included in the long message to a display 650 for presentation and stores information included in the long message for later presentation. Also depending on the operational mode of the selective call radio 106, a sensible alert device 660, for example, a tone alert device or a vibration alert device, is activated in response to the alert signal.

In this example, upon determining that the long message includes a text message, the controller 635 couples the text message to the display 650 and generates an encoded acknowledgment message. The acknowledgment message is coupled to the transmitter 683, which generates an RF transmit signal 695. The RF transmit signal 695 is coupled to the antenna 680 and transmitted.

In response to the global event signal from the global event indicator element 645, the power mode controller 651 sets the selective call radio 106 into the normal power state at the beginning of frame zero 330 of the next cycle 320. A third intercepted signal 625 is received by the receiver 610 at the frequency of the home control channel and decoded by the block word decoder 632. In response to the global event signal coupled from the global event indicator element 645, the control channel quantity element 633 determines a home channel (which may be the same as the last home channel) from the quantity of control channels and the predetermined number, and couples the new home channel to the channel selector at the end of the block information field 332, thus effecting a relatively fast changeover to the new home channel as a result of the global event. At the end of the block information field 332, the power mode controller 651 switches the power mode of the selective call radio 106 to the low power mode.

It will be appreciated that when the global event indicator is set, a global event other than a change in quantity of home control channels can be indicated, either alternatively or additionally. For example, a text message is identified for processing by all selective call radios 106, by using a unique selective call address bit pattern, such as is defined for many information protocols. In accordance with the preferred embodiment of the present invention, the all call, or global address, is indicated by an all 1 pattern in 17 predetermined bit locations of a two word address in the address field 333 of frame zero. The selective call radio 106 includes the all call address as one of the embedded addresses and the address decoder decodes this pattern when it is included in any frame (when the selective call radio 106 is in the receive state). The subvector associated with the all call address indicates the location in frame zero at which the vector for the text message begins, unless the text message is short (e.g., less than six words long), in which case the text message is typically included in the frame zero and the location of the text message is indicated by the subvector.

It will be appreciated that in the two examples of global events described above, the control channel quantity element 633 and the address decoder 631 each perform a global event information decoding function, and the home channel identifier element 634 and message processor 642 perform information processing functions, respectively, for the information decoded by the control channel quantity element 633 and the address decoder 631.

The receiver 610 in the preferred and alternative embodiments of the present invention in FIG. 6 is preferably a conventional dual conversion receiver of a type well known to those skilled in the art, but can alternatively be of other conventional types, such as a single conversion or zero intermediate frequency (ZIF) receiver. The code memory 640 is conventional EPROM, or conventional SRAM or another conventional memory type which is well known to those skilled in the art. The display 650 is an LCD display of a type well known to those skilled in the art, and the antenna 680, switches 670, and alert device 660 are devices also well known to those skilled in the art. The controller 635 is preferably implemented within a controller section which includes, but is not limited to conventional hardware circuits including a microprocessor, timing circuits, random access memory, non-volatile memory such as EPROM, and input/output circuitry. The conventional functions of the bit recovery element 646, the block word decoder 632, the frame information word decoder 644, and the address decoder 631 as described herein are controlled by firmware routines developed in accordance with techniques well known to one of ordinary skill in the art. The unique functions of the global event indicator element 645, the power mode controller 651, the block word decoder 632, the message processor 642, the channel selector 639, the control channel quantity element 633, the home channel identifier element 634, and the lost control channel element 638 as described herein are controlled by unique firmware routines developed in accordance with techniques well known to one of ordinary skill in the art. The microprocessor is preferably one of the 68HC05 family microprocessors made by Motorola, Inc. of Schaumburg, Ill. The transmitter 683 is a conventional low power transmitter of a type well known to those skilled in the art.

It will be appreciated that the techniques described herein for determining a home control channel and for communicating a global event are equally useful in a system in which the multichannel radios are not selective call radios, for example a system in which each multichannel radio is assigned a predetermined frame of a home control channel in which all information in the frame is for all such multichannel radios assigned to the same frame on the same channel. When the number of control channels is made larger or smaller, the radios become distributed, respectively, into smaller or larger groups of radios which receive at each frame time. When a global event indication is sent, all radios listen to frame zero as described above.

It will also be appreciated that the technique described herein for communicating a global event is effective in a radio communication system 100 having a single outbound radio channel, as well as the multichannel system described.

Figure 7:
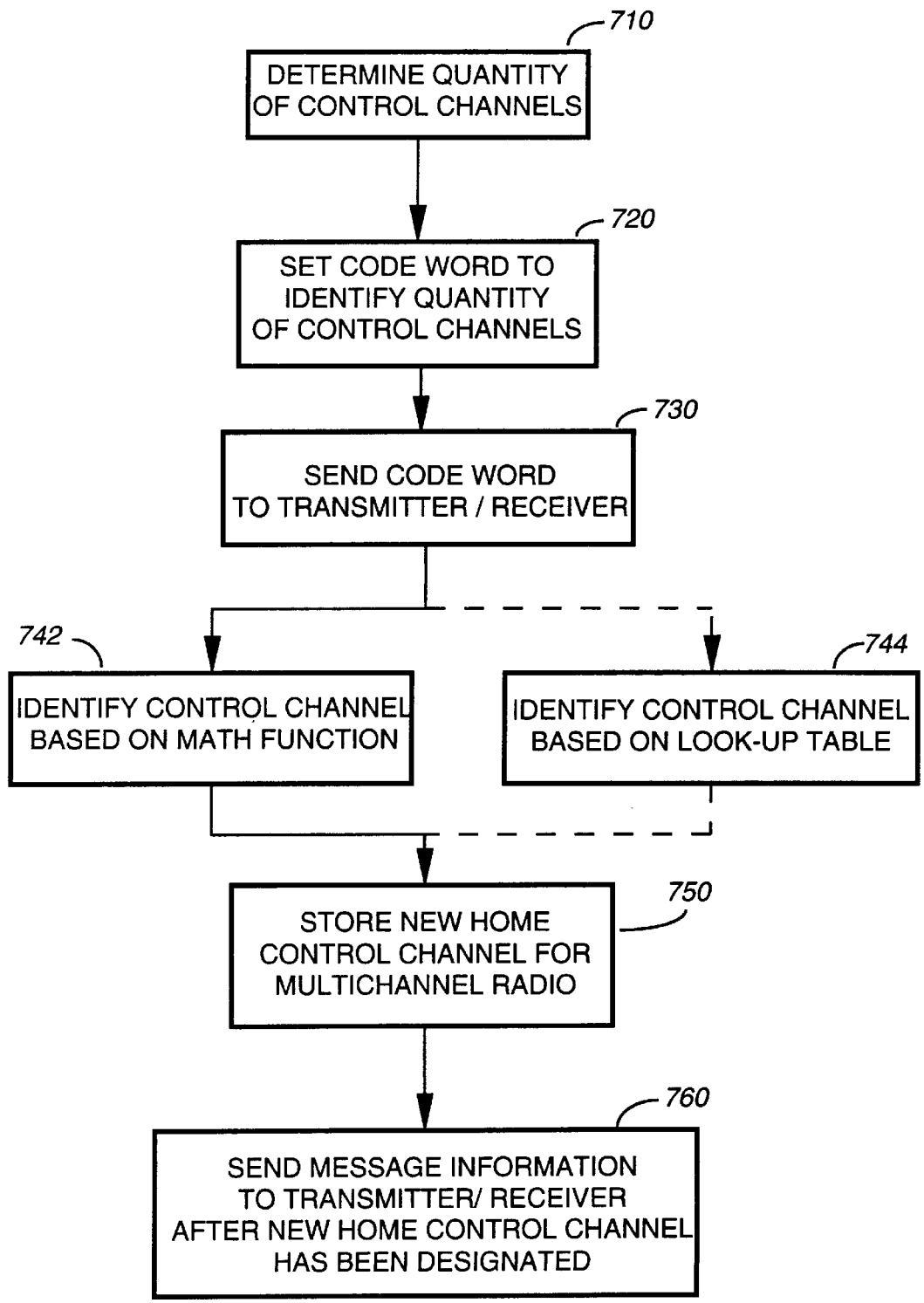
FIG. 7 shows a flow chart of a method used in the system controller, in accordance with the preferred and alternative embodiments of the present invention.

Referring to FIG. 7, a flow chart is shown which illustrates a method used in a system controller 102 of the radio communication system 100 for setting a variable quantity of control channels and for determining which control channel in the set of control channels to use when communicating with a selective call radio 106, in accordance with the preferred embodiment of the present invention.

At step 710, the channel organizer element 236 which is coupled to the outbound message memory 208 determines that a different number of control channels than is currently used by the system would more efficiently handle the message traffic load of the system.

At step 720, the channel organizer element 236 generates the new quantity of control channels, which is coupled to the control channel indicator element 238 and the home channel identifier element 230.

At step 730, the control channel indicator element 238 encodes the new quantity of control channels as a portion of a code word which is coupled to the global event information element 240 for later coupling to the cell site controller 202 in a subsequent time period when the code word will be delivered as global event information. Until the time arrives for the delivery of the global event information (in this case the new quantity of control channels), the global event information element 240 will continue relaying the previous value of the quantity of control channels.

In the second alternative embodiment, at step 730, the control channel indicator element 238 relays the quantity of control channels directly to the cell site controller for substantially immediate encoding and transmission on the control channels.

At step 742, when a message is to be delivered to a selective call radio 106, the home channel identifier element 230 updates the subscriber data base 220 with the new home control channel which will be assigned to the selective call radio 106 to be used message delivery by the communication system 100. In accordance with the preferred embodiment of the present invention, the home channel identifier element 230 uses a mathematical calculation element 232 to determine the home control channel for the selective call radio 106. The mathematical calculation element 232 uses the quantity of control channels which is determined by the channel organizer element 236 and a predetermined number specifically assigned to each selective call radio 106 to determine the home control channel assignment for the selective call radio 106.

At step 744, in the first alternative embodiment of the present invention, the home channel identifier element 230 uses a lookup table 234 to determine the home control channel for the selective call radio 106. The lookup table 234 uses the quantity of control channels which is determined by the channel organizer element 236 and a predetermined number specifically assigned to the selective call radio 106 to make the home control channel assignment for the selective call radio 106.

It will be appreciated that in accordance with either the preferred or alternative embodiments of steps 742 or 744, the predetermined number assigned to the selective call radio 106 could be any number stored in the memory of the selective call radio 106 and it could be the same as or derived from the selective call radio 106 address.

At step 750, the selective call radio 106 new home channel is stored for later use in message delivery. It will be appreciated that the determination of the home channel of each selective call radio 106 could be determined as each message is to be transmitted to the selective call radios 106. In this case it would not be necessary to update the subscriber data base 220 with the home control channel information.

Figure 8:
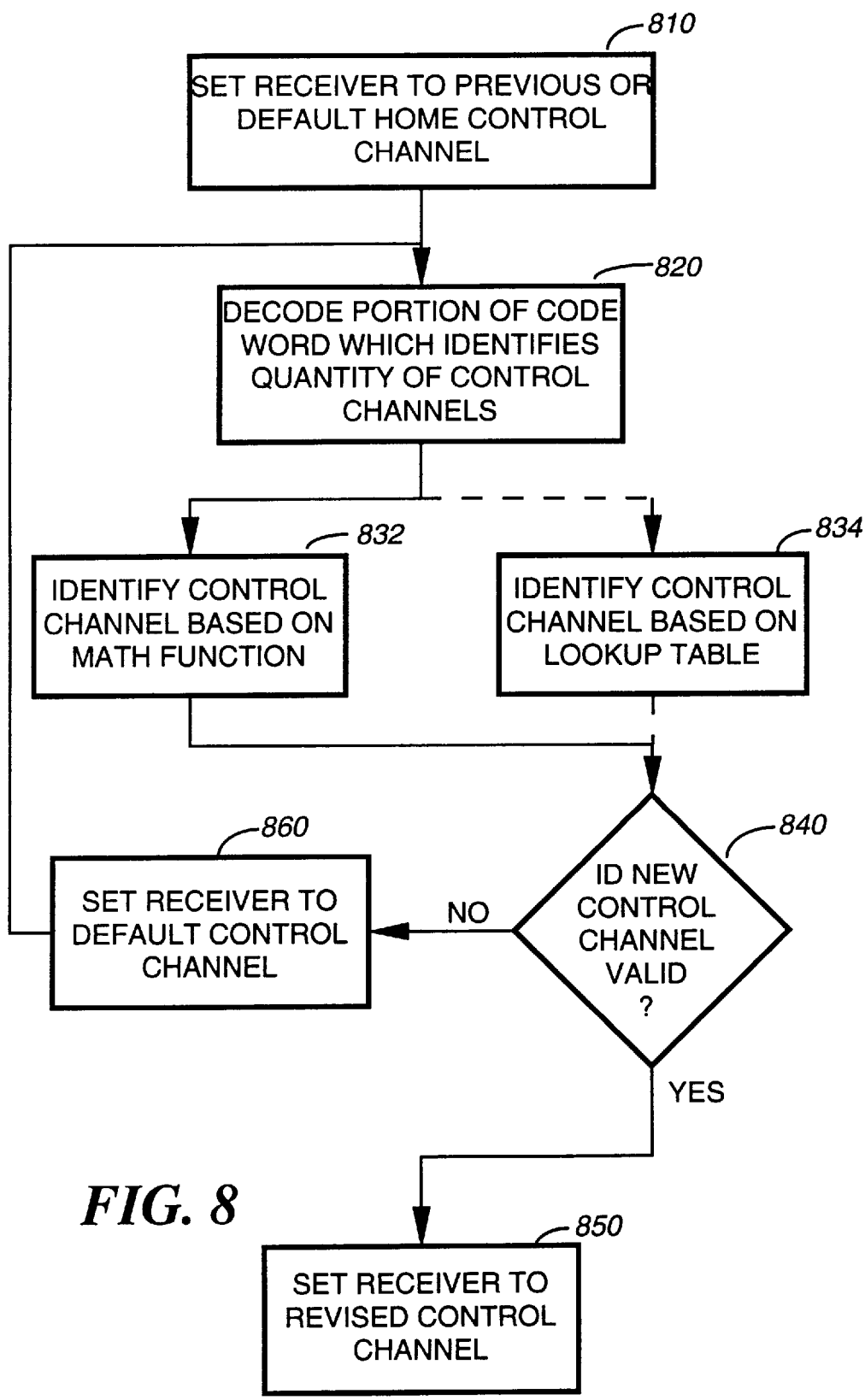
FIG. 8 show a flow chart of a method used in the selective call radio, in accordance with the preferred and alternative embodiments of the present invention.

Referring to FIG. 8, a flow chart is shown which illustrates a method used in a selective call radio 106 of the radio communication system 100 for determining which control channel in a set of control channels to use when communicating with the radio communication system 100, in accordance with the preferred embodiment of the present invention.

At step 810, the multichannel selective call radio 106 is set to receive either a valid control channel as previously determined by the home channel identifier element 634, or to a default control channel as determined by the lost control channel element 638.

At step 820, the control channel quantity element 633 decodes the portion of the block information field 332 that identifies the quantity of active outbound radio channels which are used as control channels.

At step 832, in the preferred embodiment of the present invention, the home control channel identifier element 634 uses a calculation element 636 to determine the home control channel to be used by the multichannel selective call radio 106. This calculation performed in the calculation element 636 is preferably made using the predetermined mathematical function described above with reference to FIG. 2 which uses the quantity of control channels specified by the control channel quantity element 633 and a predetermined number as input.

At step 834, in the third alternative embodiment of the present invention, the home channel identifier element 634 uses the lookup table 637 which functions similarly to the look-up table 234 described above with reference to FIG. 2 to determine the home control channel for the selective call radio 106. The lookup table 637 uses the quantity of control channels which is determined by the control channel quantity element 633 and a predetermined number specifically assigned to the selective call radio 106 to make the home control channel assignment for the selective call radio 106.

It will be appreciated that in accordance with either the preferred or alternative embodiments of steps 832 or 834, the predetermined number assigned to the selective call radio 106 could be any number stored in the memory of the selective call radio 106 and it could be the same as or derived from the selective call radio 106 address.

At step 840, when the multichannel radio 106 has not decoded a valid portion of a block information field which includes the control channel quantity information for a predetermined number of transmission cycles, a determination is made that control channel to which the multichannel radio is set is invalid. Conversely, when the multichannel radio 106 has decoded a valid control channel quantity information, the control channel determined by the home channel identifier element 634 is deemed to be valid.

At step 850 (which is executed when the present control channel is deemed to be valid in step 840), the multichannel radio is set to the control channel as determined by the home channel identifier element 634.

At step 860 (which is executed when the present control channel is deemed to be invalid in step 840), the lost control channel element 638 sets the multichannel radio 106 to receive on a predetermined default control channel.

By now it should be appreciated that there has been provided a technique which communicates a new home control channel assignments for multichannel radios in a multichannel radio communication system by simply communicating the number of control channels to be used and performing internal operations in each multichannel radio and the system controller to determine a new home control channel for each multichannel radio, thereby avoiding the inefficiency of communicating new home control channel assignments to all multichannel radios affected by the change, while also maintaining a substantially uniform distribution of the multichannel radios over the set of control channels in use.

I claim:

1. A method used in a multichannel radio for receiving a first radio signal within a home control channel, wherein the multichannel radio is used within a radio communication system having a plurality of outbound radio channels, and wherein a set of control channels is a subset of the plurality of outbound radio channels, and wherein the method comprises the steps of:

setting a receiver in the multichannel radio to a first channel which is one of the plurality of outbound radio channels;

decoding a predetermined portion of a code word included in a predetermined portion of a second radio signal received within the first channel which identifies a quantity of control channels which form the set of control channels;

identifying one of the set of control channels as a new home control channel based on the quantity of control channels and a predetermined number in the multichannel radio and revising the home control channel to the new home control channel; and setting said receiver to the home control channel as revised in said step of identifying, for receiving the first radio signal.

2. The method according to claim 1, further comprising a step of revising the home control channel to a predetermined default control channel when the portion of the code word included in the predetermined portion of the second radio signal is not decoded in said step of decoding within a predetermined number of transmission cycles.

3. The method according to claim 1, wherein the multichannel radio has a selective call address, and wherein the predetermined number in said step of identifying is a predetermined portion of the selective call.

4. The method according to claim 1, wherein said step of identifying comprises the step of:
determining an identification of the new home control channel as a mathematical function of the predetermined number and the quantity of control channels.

5. The method according to claim 1, wherein said step of identifying comprises the step of:
determining an identification of the new home control channel using a look-up table having the predetermined number and the quantity of control channels as inputs.

6. The method according to claim 1, wherein the first channel in said step of setting the receiver in the multichannel radio to a first channel is one of the set of control channels.

7. The method according to claim 1, wherein information in the first radio signal in said steps of setting said receiver to the home control channel and in the second radio signal in said step of decoding the predetermined portion of the code word is organized according to an outbound signaling protocol having protocol divisions of cycle, frame, block, word, and bit equivalent in quantity, duration, and numbering to a FLEX™ protocol, and wherein the predeteremined portion of the code word which identifies the quantity of control channels is in a predetermined word of a predetermined block of a frame of the outbound signaling protocol.

8. A method used in a system controller for transmitting a radio signal to a multichannel radio within a home control channel in a radio communication system having a plurality of outbound radio channels, wherein a set of control channels are a subset of the plurality of outbound radio channels, and wherein the method comprises the steps of:
determining a quantity of control channels which form the set of control channels;
setting a predetermined portion of a code word to identify the quantity of control channels;
sending the code word to a transmitter/receiver for transmission in a predetermined portion of each of a plurality of radio signals transmitted within the set of control channels during a first transmission cycle;
identifying one of the set of control channels as a new home control channel for the multichannel radio based on the quantity of control channels and a predetermined number stored in the multichannel radio;
storing the new home control channel as the home control channel associated with the multichannel radio; and
sending information to a transmitter/receiver for inclusion in the radio signal, wherein the radio signal is transmitted within the home control channel during a transmission cycle subsequent to the first transmission cycle.

9. The method according to claim 8, wherein the radio signal in said step of sending information to a transmitter/receiver includes an address of the multichannel radio.

10. The method according to claim 8, wherein said step of identifying comprises the step of:
determining an identification of the new home control channel as a mathematical function of the predetermined number and the quantity of control channels.

11. The method according to claim 8, wherein said step of identifying comprises the step of:
determining an identification of the new home control channel using a look-up table having the predetermined number and the quantity of control channels as inputs.

12. The method according to claim 8, wherein the predetermined number in said step of identifying one of the set of control channels is a predetermined portion of a address of the multichannel radio.

13. The method according to claim 8, wherein information in the plurality of radio signals in said step of sending the code word to a transmitter/receiver and in the radio signal in said step of sending information to a transmitter/receiver is organized according to an outbound signaling protocol having protocol divisions of cycle, frame, block, word, and bit equivalent in quantity, duration, and numbering to a FLEX™ protocol, and wherein the predetermined portion of the code word which identifies the quantity of control channels is in a predetermined word of a predetermined block of a frame of the outbound signaling protocol.

14. A multichannel radio for receiving a first radio signal within a home control channel, wherein the multichannel is used within a radio communication system having a plurality of outbound radio channels, and wherein a set of control channels is a subset of the plurality of outbound radio channels, and wherein the multichannel radio comprises:
a receiver for receiving and demodulating radio signals;
a decoder coupled to said receiver for decoding code words from the radio signals;
a channel selector element coupled to said receiver for setting said receiver in the multichannel radio to a first channel which is one of the plurality of outbound radio channels;
a control channel quantity element coupled to said decoder for decoding a predetermined portion of a code word included in a predetermined portion of a second radio signal received within the first channel which identifies a quantity of control channels which form the set of control channels;
a home channel identifier element for identifying one of the set of control channels as a new home control channel based on the quantity of control channels and a predetermined number in the multichannel radio and revising the home control channel to the new home control channel; and
wherein the channel selector element is further coupled to said home channel identifier element for setting said receiver to the home control channel as revised by said home channel identifier element, for receiving the first radio signal.

15. The multichannel radio according to claim 14, further comprising a lost control channel element coupled to said control channel quantity element and said channel selector element for revising the home control channel to a predetermined default control channel when the portion of the code word included in the predetermined portion of the second radio signal is not decoded by said control channel quantity element within a predetermined number of transmission cycles.

16. The multichannel radio according to claim 14, wherein the multichannel radio further comprises a code memory for storing a selective call address, and wherein the predetermined number is a predetermined portion of the selective call address.

17. The multichannel radio according to claim 14, wherein said home channel identifier element comprises a calculation element for determining an identification of the new home control channel as a mathematical function of the predetermined number and the quantity of control channels.

18. The multichannel radio according to claim 14, wherein said home channel identifier element comprises a look up table for determining an identification of the new home control channel, wherein the look up table has the predetermined number and the quantity of control channels as inputs.

19. The multichannel radio according to claim 14, wherein the first channel which is set by said channel selector element is one of the set of control channels.

20. The multichannel radio according to claim 14, wherein information in the first radio signal in and the second radio signal received by said receiver when set by said channel selector element is organized according to an outbound signaling protocol having protocol divisions of cycle, frame, block, word, and bit equivalent in quantity, duration, and numbering to a FLEX™ protocol, and wherein the predetermined portion of the code word which identifies the quantity of control channels is in a predetermined word of a predetermined block of a frame of the outbound signaling protocol.

21. A system controller for transmitting a radio signal to a multichannel radio, wherein the multichannel radio is used within a home control channel in a radio communication system having a plurality of outbound radio channels, and wherein a set of control channels are a subset of the plurality of outbound radio channels, and wherein the system controller comprises:

an outbound message memory for storing a queue of outbound messages intended for a plurality of multichannel radios;

a channel organizer element coupled to said outbound message memory for determining a quantity of control channels which form the set of control channels;

a control channel indicator element coupled to said channel organizer element for setting a predetermined portion of a code word to identify the quantity of control channels;

a cell site controller coupled to said control channel indicator element for sending the code word to a transmitter/receiver for transmission in a predetermined portion of each of a plurality of radio signals transmitted within the set of control channels during a first transmission cycle;

a subscriber data base for storing a first predetermined number which is based on a second predetermined number stored in the multichannel radio;

a home channel identifier element coupled to said channel organizer element and said subscriber data base for identifying one of the set of control channels as a new home control channel for the multichannel radio based on the quantity of control channels and the second predetermined number stored in the multichannel radio;

wherein said subscriber data base is coupled to said home channel identifier element for storing the new home control channel as the home control channel associated with the multichannel radio; and wherein said cell site controller is further coupled to said outbound message memory and said subscriber data base for sending message information to the transmitter/receiver for inclusion in the radio signal which is transmitted within the home control channel stored in said subscriber data base during a transmission cycle subsequent to the first transmission cycle.

22. The system controller according to claim 21, wherein said cell site controller includes an address of the multichannel radio in the radio signal.

23. The system controller according to claim 21, wherein said home channel identifier element includes a calculation element for determining an identification of the new home control channel as a mathematical function of the second predetermined number and the quantity of control channels.

24. The system controller according to claim 21, wherein said home channel identifier element includes a look up table for determining an identification of the new home control channel, and wherein the look up table has the second predetermined number and the quantity of control channels as inputs.

25. The system controller according to claim 21, wherein information in the plurality of radio signals and the radio signal sent by said cell site controller for transmission by said transmitter/receiver is organized according to an outbound signaling protocol having protocol divisions of cycle, frame, block, word, and bit equivalent in quantity, duration, and numbering to a FLEX™ protocol, and wherein the predetermined portion of the code word which identifies the quantity of control channels is in a predetermined word of a predetermined block of a frame of the outbound signaling protocol.

* * * * *